（12）United States Patent
Lee et al.

(10) Patent No.: US 8,160,025 B2
(45) Date of Patent: Apr. 17, 2012

(54) METHOD FOR DATA TRANSMISSION DURING A HANDOVER IN MOBILE COMMUNICATIONS SYSTEM

(75) Inventors: Young-Dae Lee, Gyeonggi-Do (KR); Sung-Duck Chun, Gyeonggi-Do (KR); Myung-Cheul Jung, Seoul (KR); Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 664 days.

(21) Appl. No.: 12/299,116

(22) PCT Filed: Nov. 14, 2006

(86) PCT No.: PCT/KR2006/004776
§ 371 (c)(1),
(2), (4) Date: Oct. 30, 2008

(87) PCT Pub. No.: WO2007/126192
PCT Pub. Date: Nov. 8, 2007

(65) Prior Publication Data
US 2009/0185535 A1     Jul. 23, 2009

Related U.S. Application Data

(60) Provisional application No. 60/797,402, filed on May 2, 2006.

(30) Foreign Application Priority Data

Sep. 4, 2006  (KR) .................. 10-2006-0084886

(51) Int. Cl.
*H04W 4/00* (2009.01)
*H04W 36/00* (2009.01)
*H04L 12/28* (2006.01)

(52) U.S. Cl. .................. 370/331; 370/394; 455/438

(58) Field of Classification Search .................. None
See application file for complete search history.

(56) References Cited

U.S. PATENT DOCUMENTS 5,794,149 A * 8/1998 Hoo .................. 455/438
7,313,414 B2 12/2007 van Rooyen
7,626,960 B2 12/2009 Muller
7,885,663 B2 2/2011 Fischer et al.
(Continued)

FOREIGN PATENT DOCUMENTS
CN     1642066     7/2005
(Continued)

OTHER PUBLICATIONS

LG Electronics, "MBMS dual receiver," R2-060582, 3GPP TSG RAN WG2 Meeting #51, Feb. 2006.
(Continued)

*Primary Examiner* — Nittaya Juntima
(74) *Attorney, Agent, or Firm* — Lee, Hong, Degerman, Kang & Waimey

(57) ABSTRACT

In a wireless mobile communications system, a method of transmitting uplink data during a handover of a mobile terminal. When the mobile terminal changes its connection from a source base station to a target base station, either the source base station or the target base station transmits a reordering indication for performing a reordering process by the gateway while transmitting a received data unit from the mobile terminal to the gateway regardless of data unit sequence number, thereby optimizing data unit transmission efficiency.

12 Claims, 4 Drawing Sheets

U.S. PATENT DOCUMENTS

| | | | |
|---|---|---|---|
| 2001/0036830 | A1 | 11/2001 | Wu et al. |
| 2004/0146041 | A1 | 7/2004 | Lee et al. |
| 2004/0151133 | A1 | 8/2004 | Yi et al. |
| 2004/0224698 | A1 | 11/2004 | Yi et al. |
| 2005/0025164 | A1 | 2/2005 | Kavanagh et al. |
| 2005/0070277 | A1 | 3/2005 | Hu |
| 2005/0075124 | A1 | 4/2005 | Willenegger et al. |
| 2005/0111393 | A1 | 5/2005 | Jeong et al. |
| 2005/0138528 | A1 | 6/2005 | Ameigeiras et al. |
| 2005/0147127 | A1 | 7/2005 | Putcha et al. |
| 2005/0213575 | A1 | 9/2005 | Shin et al. |
| 2006/0030342 | A1 | 2/2006 | Hwang et al. |
| 2006/0058047 | A1 | 3/2006 | Jeong et al. |
| 2006/0098567 | A1 | 5/2006 | Willenegger et al. |
| 2006/0128427 | A1 | 6/2006 | van Rooyen |
| 2006/0140148 | A1 | 6/2006 | Kwak et al. |
| 2007/0041382 | A1* | 2/2007 | Vayanos et al. ............... 370/394 |
| 2007/0136132 | A1 | 6/2007 | Weiser et al. |
| 2007/0206530 | A1 | 9/2007 | Lee et al. |
| 2007/0298781 | A1* | 12/2007 | Jiang ............................. 455/423 |
| 2008/0031245 | A1 | 2/2008 | Pekonen |

FOREIGN PATENT DOCUMENTS

| | | |
|---|---|---|
| EP | 1478198 | 11/2004 |
| JP | 2004-135346 | 4/2004 |
| JP | 2005-117655 | 4/2005 |
| JP | 2005-518704 | 6/2005 |
| JP | 2005-252506 | 9/2005 |
| JP | 2007-522758 | 8/2007 |
| RU | 2262811 | 10/2005 |
| RU | 2263400 | 10/2005 |
| RU | 2004126154 | 1/2006 |
| RU | 2004126160 | 1/2006 |
| TW | 2007-26280 | 7/2007 |
| WO | 2004/017581 | 2/2004 |
| WO | 2004/100588 | 11/2004 |
| WO | 2005/006596 | 1/2005 |
| WO | 2005/067492 | 7/2005 |

OTHER PUBLICATIONS

LG Electronics, "Dual Receiver for MBMS," R2-061303, 3GPP TSG RAN WG2#53, May 2006.

3rd Generation Partnership Project (3GPP), "Technical Specification Group Radio Access Network; Introduction of the Multimedia Broadcast Multicast Service (MBMS) in the Radio Access Network (RAN); Stage 2 (Release 6)", 3GPP TS 25.346 V 6.7.0, Dec. 2005.

NTT Docomo Inc., "Inter-RAT state transitions between UTRAN and EUTRAN", Tdoc-R2-060093, 3GPP TSG RAN WG2 #50, Jan. 2006.

3rd Generation Partnership Project (3GPP), 3GPP TS 25.331 V 6.8.0, Dec. 2005.

* cited by examiner

[Fig. 1]
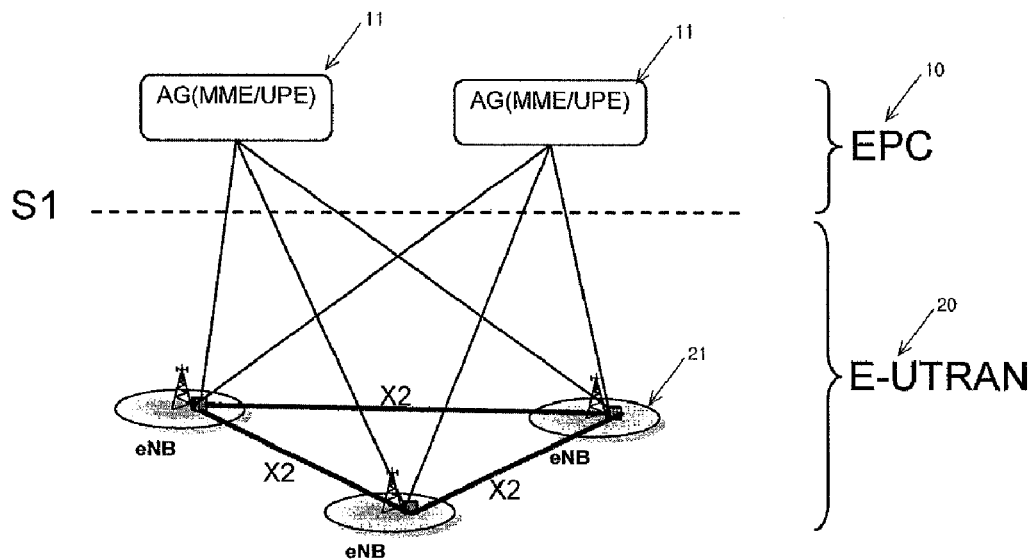
[Fig. 2]
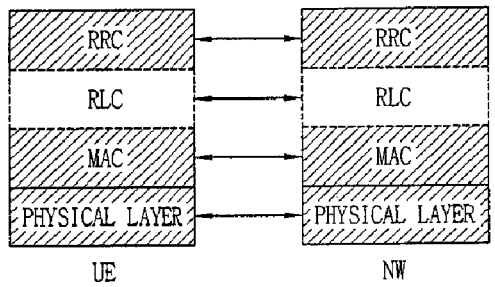
[Fig. 3]
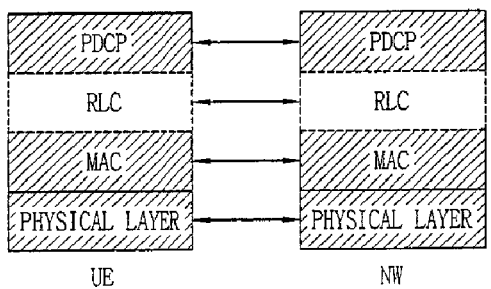

[Fig. 4]
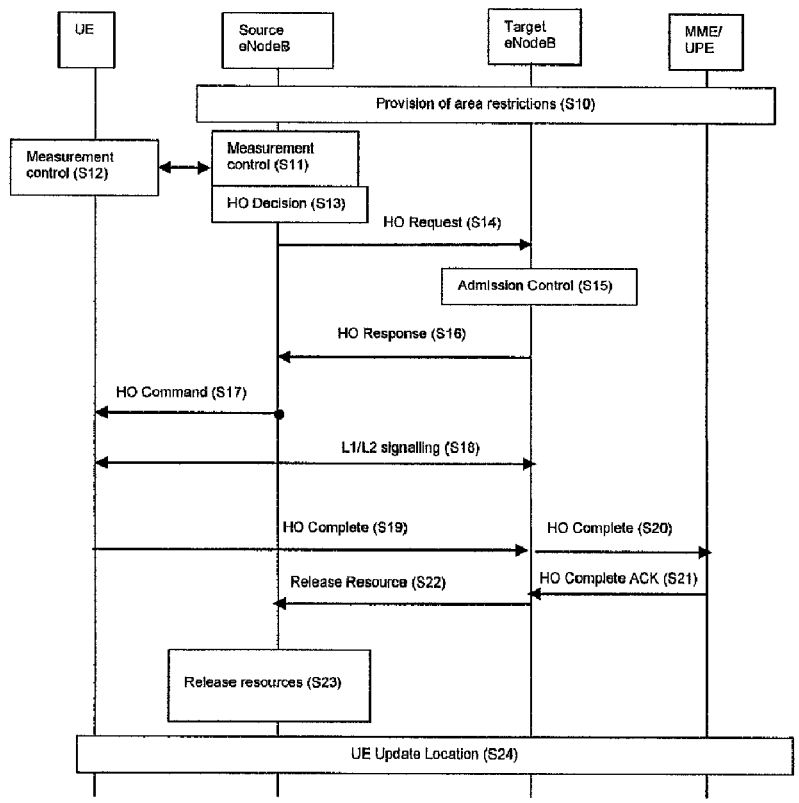
[Fig. 5]
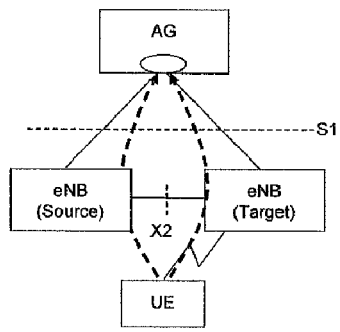
[Fig. 6]
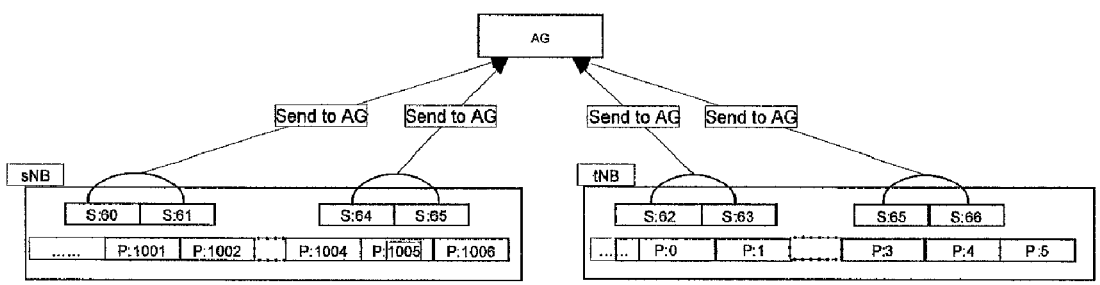

METHOD FOR DATA TRANSMISSION DURING A HANDOVER IN MOBILE COMMUNICATIONS SYSTEM

CROSS-REFERENCE TO RELATED APPLICATIONS

This application is a 371 U.S. national stage application of International Application No. PCT/KR2006/004776, filed on Nov. 14, 2006, which claims the benefit and right of priority to Korean Application No. 10-2006-0084886, filed on Sep. 4, 2006, and U.S. Provisional Application No. 60/797,402, filed on May 2, 2006.

TECHNICAL FIELD

The present invention relates to an E-UMTS (Evolved Universal Mobile Telecommunications System), and in particular, relates to a method for improving data transmission efficiency during a handover of a mobile terminal.

BACKGROUND ART

FIG. 1 is a network structure of the E-UMTS, a mobile communication system applicable to the related art and the present invention.

The E-UMTS system has been evolved from the UMTS system, for which the 3GPP is proceeding with the preparation of the basic specifications applicable thereto. The E-UMTS system can be classified as an LTE (Long Term Evolution) system.

With reference to FIG. 1, the E-UMTS network is divided into an E-UTRAN 20 and an EPC (Evolved Packet Core) 10. The E-UTRAN 20 includes a terminal (UE (User Equipment)), a base station (eNB or eNodeB) 21 and an AG (Access Gateway) 11 (which also can be expressed as 'MME/UPE'). The AG 11 can be divided into a part for handling user traffic and a part for handling control traffic. The AG part for handling new user traffic and the AG part for handling control traffic can communicate with each other via newly defined interface.

One or more cells may exist in a single eNodeB (eNB) 21, and an interface for transmitting the user traffic and the control traffic can be used between the eNodeBs.

The EPC 10 may include an AG 11, a node for user registration of the UE, and the like. Also, in the UMTS of FIG. 1, an interface for discriminating the E-UTRAN 20 and the EPC 10 can be used. An S1 interface can connect a plurality of nodes (i.e., in a many-to-many manner) between the eNodeB 21 and the AG 11. The eNodeBs are connected with each other through an X2 interface, and the X2 interface is always present between adjacent eNodeBs in a meshed network structure.

Layers of a radio interface protocol between the UE and a network can be divided into a first layer (L1), a second layer (L2) and a third layer (L3) based upon the three lower layers of an open system interconnection (OSI) standard model that is well-known in the art of communication systems.

The first layer (L1) provides an information transfer service using a physical channel, and a radio resource control (RRC) layer positioned at the third layer (L3) serves to control radio resources between the terminal and the network, for which the RRC layer exchanges an RRC message between the terminal and the network. The RRC layer can be distributed so as to be positioned in network nodes such as the eNodeBs and the AGs, etc., or can be positioned only in the eNodeBs or in the AGs.

FIG. 2 illustrates a control plane structure of the radio access interface protocol between the terminal and the UTRAN based upon various 3GPP wireless access network standards.

The radio access interface protocol has horizontal layers including a physical layer, a data link layer and a network layer, and has vertical planes including a user plane for transmitting data information and a control plane for transmitting control signals.

The protocol layers can be divided into a first layer (L1), a second layer (L2) and a third layer (L3) based upon the three lower layers of an open system interconnection (OSI) standard model that is well-known in the art of communication systems. Each layer of the control plane of the radio protocol in FIG. 2 and the user plane of the radio protocol in FIG. 3 will now be described.

The physical layer, the first layer, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 provides services to a radio link control (RLC) layer (which is a higher layer) via a logical channel. The RLC layer of Layer 2 supports the transmission of data with reliability. It should be noted that the RLC layer in FIGS. 2 and 3 is depicted in dotted lines, because if the RLC functions are implemented in and performed by the MAC layer, the RLC layer itself may not need to exist. The PDCP layer of Layer 2 performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

Downlink transport channels for transmitting data from the network to the terminal, include a broadcast channel (BCH) for transmitting system information and a downlink shared channel (SCH) for transmitting the user traffic or the control message. Downlink multicast, traffic of a broadcast service or a control message can be transmitted through the downlink SCH or through a separate downlink multicast channel (MCH).

Uplink transport channels for transmitting data from the terminal to the network include a random access channel (RACH) for transmitting an initial control message and an uplink SCH for transmitting the user traffic and the control message.

DISCLOSURE OF INVENTION

Technical Problem

In the related art, either a terminal or a base station performs a reordering process to transmit data units (i.e., SDUs) in sequential order when the terminal and the base station communicate data units with each other. However, if the terminal moves to a new base station (i.e., when handover occurs) while the terminal transmits one or more uplink data units to a particular base station, the particular base station stops to transmit, to an upper node (i.e. Gateway), the received data unit(s) for a certain time period in order to receive one or more data unit(s) which has not been received by the particular base station (i.e. data unit(s) are transmitted to a new base station). The reason for this time delay is due to the fact that the particular base station can not determine whether the new base station properly receives the data unit(s) which has not been received by the particular base station or not. Therefore, the time for a data unit transmission is delayed because the particular base station has to wait for receiving the data unit which was already received by the new base station, and a buffer in the particular base station is unnecessarily used because the particular base station does not transmit the sequentially received data unit to the upper node for the certain period of time. As such, in the related art, there is the disadvantage of inefficient data unit transmission when the terminal transmits the uplink data unit to the gateway while the handover is performed by the terminal.

Technical Solution

One exemplary feature of the present invention is to provide a method for improving uplink data transmission efficiency for a handover procedure of a mobile terminal.

To implement at least the above feature in whole or in parts, the present invention provides a method for transmitting data in a mobile communication system that may include: when a mobile terminal performs handover, a base station transmits reordering related information of a data unit to a gateway, the gateway reorders the received data unit from one or more base stations according to the reordering related information.

The data unit may be a Radio Link Controller (RLC) Service data unit (SDU).

The reordering related information may be transmitted through a signaling message which generates between a RLC layer of the base station and a PDCP layer of the gateway.

The signaling message may be a reordering indication message.

The reordering indication message may be either a unidirectional message or a bi-directional message.

The reordering related information may be transmitted or received via at least one of a RLC generated data unit, a single bit, and a header field of the RLC.

The base station may be either a source base station or a target base station.

The base station may transmit a received data unit, which received before the handover is performed, regardless of sequential number to the gateway.

The reordering process for the data unit may be performed by a PDCP layer of the gateway or a lower layer below the PDCP layer, and the transmitted data unit from the terminal may be stored at a reordering buffer in the gateway.

BRIEF DESCRIPTION OF THE DRAWINGS

Certain exemplary embodiments will be described in detail with reference to the following drawings in which like reference numerals refer to like elements wherein:

FIG. 1 shows an exemplary network structure of an E-UMTS, a mobile communication system for which a related art and the present invention are applied.

FIG. 2 is an exemplary structure of a control plane of a radio interface protocol between a terminal and a UTRAN based on a 3GPP wireless access network specification.

FIG. 3 is an exemplary structure of a user plane of the radio interface protocol between the terminal and the UTRAN based on the 3GPP wireless access network specification.

FIG. 4 shows an exemplary Inter-eNodeB handover procedure.

FIG. 5 shows a method of transmitting uplink data unit in a mobile communications system.

FIG. 6 shows a method of transmitting data unit from a terminal to a RLC of a base station, and then transmitting the received data unit from the RLC to a gateway.

MODE FOR THE INVENTION

Figure 7:
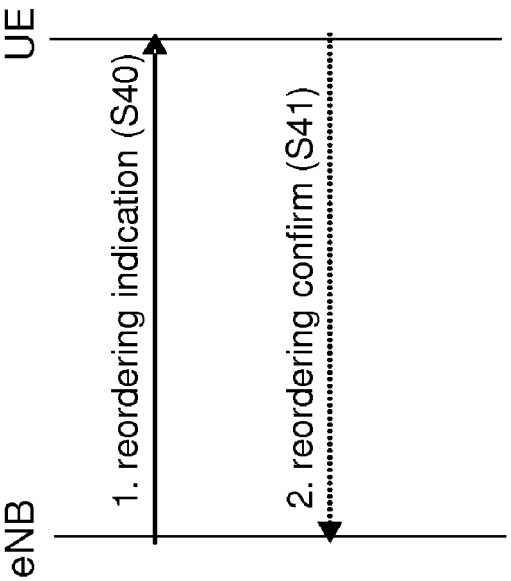
FIG. 7 shows an exemplary data flow for a reordering process between an eNodeB and an AG for uplink data unit transmission.

One aspect of the present invention relates to the recognition by the present inventors about the problems of the related art as described above, and further explained hereafter. Based upon this recognition, the features of the present invention have been developed.

Although the present invention is shown to be implemented in a mobile communication system, such as a UMTS developed under 3GPP specifications, the present invention can also be applied to other communication systems operating in conformity with different standards and specifications.

As network technology continues to develop, it is foreseen that RNCs may no longer be necessary in future networks, because Node Bs with enhanced capabilities, or other types of network entities (e.g. so-called Access Gateways) may handle the operations performed by currently existing RNCs. Such long-term evolution issues further support the need to develop improved radio admission control techniques to be used in admitting new terminals (or establishing new user links) and supporting newly developing enhanced services for a greater number of terminals being managed by the network.

The present invention provides an improved method of transmitting uplink data for a handover procedure of a mobile terminal. Namely, when the mobile terminal changes its connection from a first radio network node, with which the mobile terminal is currently connected with, to a second radio network node, the first radio network node or the second radio network node may transmit a reordering indication for one or more data units to a gateway (or other network entity) while transmitting one or more previously received data units, from the terminal, to the gateway regardless of data unit sequence number, thereby optimizing data unit transmission efficiency.

The first radio network node may be a base station node source eNB with which the mobile terminal is currently connected to receive a service, and the second radio network node may be a base station node target eNB to which the mobile terminal is going to move to receive a service.

The present invention provides a method of performing a reordering process for data units (i.e., SDUs) which is transmitted through the base station from a terminal when a handover is performed by the terminal.

Namely, during the handover, the base station may transmit any received data unit(s) from the terminal to the gateway without considering a sequence number of the data unit(s) when the data unit(s) is transmitted to an upper node (i.e.

gateway) through the base station from the terminal, and the gateway may re-order the received data unit(s) from the base station in sequential order.

Specifically, the source base station may transmit a reordering indication message (or other type of signaling) to the gateway in order to perform a reordering process by the gateway. The reordering indication message may be transmitted to the gateway before the terminal is about to perform the handover or during the terminal performs the handover, and the reordering indication message may be transmitted from the source base station or the target base station.

The data unit may represent a data block which will be transmitted from a particular protocol (or node) to an upper protocol (or node). The data unit may be a Service data unit (SDU) of a Radio Link control (RLC) entity. The base station may also indicate to perform the reordering process by transmitting a message to the gateway in a form of a single bit or by including the message in a header field of the RLC.

The base station may not consider a sequence number of the data unit after knowing that the gateway will perform the reordering process. In other words, the base station itself does not perform the reordering process any more if the gateway is to perform reordering. As such, if there is any uplink data unit(s) that is received from the terminal, the base station immediately may transmit the received uplink data unit(s) to the gateway without considering an order of data unit (i.e. sequence number).

For example, when the RLC of the base station completely receives a particular sequence of SDUs by receiving PDUs from lower layer, the RLC immediately transmits the received SDUs to the upper layer (i.e., gateway) without considering the sequence number of each SDU. Here, the SDUs, which are transmitted to the gateway, may be received by an upper layer of RLC (i.e., PDCP) as well.

The data units are not always received in sequential order when the gateway receives the data units from the base station. Also, the gateway may receive the data units not only from a single base station but also from a plurality of base stations. The gateway may store the received data units (not sequentially ordered data units) in a reordering buffer in order to transmit the received data units to an upper layer (or node) with sequential order. Also, the gateway may transmit the data units to the upper layer (or node) when the sequential order of the data units is completed after all of not-received data units are received by the gateway.

For example, the RLC of the base station may transmit the SDUs to the gateway, the PDCP layer of the gateway may receive the SDUs from the base station. Here, the received SDUs may not be in sequential order. Also, the gateway may receive the SDUs through a plurality of base station even if the SDUs are originally transmitted from one terminal. The PDCP layer of the gateway or a lower layer below the PDCP of the gateway may store the SDUs in a reordering buffer to make the SDUs in sequential order. The PDCP layer of the gateway may transmit the SDUs to an upper layer (or node) whenever any sequential order reception for the SDUs is made.

FIG. 4 shows an exemplary inter-eNodeB handover procedure. First, the source eNodeB may exchange area restriction information with an Access Gateway (AG) or MME/UPE (S10). Here, the area restriction information may be included in an UE context.

The source eNodeB may transmit a radio resource measurement condition to the UE (referred to "terminal" hereafter) (S11), and the terminal may transmit a result of the radio resource measurement to the source eNodeB according to the received radio resource measurement condition (S12). The source eNodeB may transmit a handover (HO) request message to the target eNodeB after making a handover decision whether to connect with a neighbor base station (or cell) based on the received radio resource measurement result from the terminal (S13, S14).

The target eNodeB may determine whether to accept the HO request message based upon a radio resource of the target eNodeB (S15). If the HO request message is accepted, the target base station may transmit a HO response message to the source eNodeB (S16), and then the source eNodeB may transmit a HO command to the terminal (S17).

The terminal, which received the HO command, may perform a signaling to connect between the target eNodeB and a layer 1 (L1), a layer 2 (L2) level. Such L1/L2 signaling may include a synchronization process. The terminal may transmit a HO complete message to the target eNodeB when the L1 and L2 connection is terminated (S19), the target eNodeB may transmit a HO complete message to the gateway (AG) (or MME/UPE) (S20).

The AG, which received the HO complete message, may transmit a HO complete ACK message to the target eNodeB (S21), the target eNodeB may transmit a resource release message to the source eNodeB (S22). Thereafter, the source eNodeB, which received the resource release message, may release all handover related radio resources, and the terminal may update a location (S23, S24).

FIG. 5 shows a method of transmitting the uplink data unit in the mobile communications system.

As illustrated in FIG. 5, during the handover, the source eNodeB and the target eNodeB may not perform a reordering process when the terminal transmits a data unit in uplink, rather such reordering process can be performed by the gateway. Thus, the gateway may receive the uplink data unit from the source eNodeB and the target eNodeB, which originally transmitted from one or more terminals, and then performing the reordering process. The data unit may be stored in a reordering buffer (oval shape within AG in FIG. 5) of the gateway. The reordering buffer may be located in a PDCP of the gateway or in a function block of lower layer below the PDCP.

FIG. 6 shows a method of transmitting data unit [e.g., SDU] from the mobile terminal to the RLC of the base station, and then transmitting the received data unit from the RLC to the gateway.

The RLC is located at an upper layer of MAC of the base station in E-UTRAN. The RLC may generate a SDU from a received PDU. In FIG. 6, "S" represents the SDU, "P" represents the PDU, "sNB" represents the source eNodeB, and "tNB" represents the target eNodeB.

In general, the RLC may not receive the PDU in sequential order, and a received SDU by the eNode B may not be in sequential order. In FIG. 6, "S60", "S61", "S64" and "S65" may be considered as completely received SDUs because corresponding PDUs are received completely to generate the SDUs. However, "S62" and "S63" are not received completely because corresponding PDUs are not received completely.

Therefore, if the handover is not performed, the terminal may keep attempting to retransmit the PDUs to the source base station (sNB), and the gateway will receive the SDUs by receiving the PDUs through the source base station. Whereas, if the handover is performed, the terminal may transmit the PDUs to a target base station (tNB) instead of the source base station. So, during the handover, the target base station may generate particular SDUs even if the source base station does not receive particular PDUs.

In FIG. 6, the target base station may generate the "S62" and the "S63" by receiving corresponding PDUs for the "S62" and "S63". Here, the source base station may not know whether the target base station receives the "S62" and "S63" or not. As such, the source base station may request to retransmit the "S62" and "S63" for sequential order of the SDU, and it may cause unnecessary time delay.

Therefore, if the gateway can receive the SDUs from a plurality of base stations, the reordering process performed by the gateway may be much efficient method than performing a reordering process in the base station (sNB, tNB) during the handover.

Here, the source base station may transmit the "S60", "S61", "S63" and "S64" immediately to the upper node (gateway) if complete reception is confirmed. The target base station may transmit the SDUs (i.e., "S62" and "S63") immediately to the gateway if each SDU is received completely, or the target base station may transmit the SDUs (i.e., "S62" and "S63") sequentially after performing a reordering process by the base station itself.

FIG. 7 shows an exemplary data flow for the reordering process between the eNodeB and the AG for uplink data unit transmission.

Figure 8:
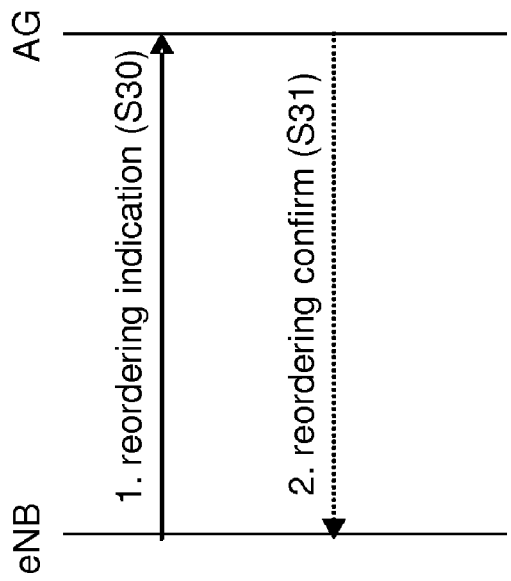
FIG. 8 shows an exemplary data flow for a reordering process between an eNodeB and an UE for downlink data unit transmission.

The base station may determine whether the terminal is needed to perform the handover by receiving measurement information from the terminal. If the handover is needed to be performed for the terminal, as illustrated in FIG. 8, the base station may transmit a reordering indication message to the gateway in order to execute the data unit reordering process by the gateway. (S30)

The reordering indication message may be a uni-directional message or a bi-direction message (S31). The reordering indication message may be a signaling message that may generate between the base station and the gateway. Also, a request for performing the reordering function may be included in the data unit or in a certain information field of other signaling message.

For example, the RLC of the base station may not perform the reordering function when the handover is ready to be performed, and may send a request for reordering process to the gateway through a signaling message. Also, the base station may indicate (or set) whether a reordering function needs to be performed or not by the gateway by using a message or a signal in a certain field of the RLC or MAC. Moreover, the base station may keep to performing the reordering process, and may allow the gateway to perform another reordering process. The gateway may transmit the uplink data unit(s) after performing the reordering process of the data unit(s) according to the reordering indication message from the base station.

FIG. 8 shows an exemplary data flow for the reordering process between the eNode B and the UE for downlink data unit transmission.

As illustrated in FIG. 8, the base station may transmit the reordering indication message not only for the uplink data unit transmission but also for the downlink data unit transmission (S40). In this case, the reordering indication message may be a unidirectional message or a bi-direction message (S41).

The reordering indication message may indicate how the terminal performs the reordering process. The base station may request to perform the reordering process in the PDCP layer of the terminal by generating the reordering indication message. Here, the PDCP layer of the terminal may perform the reordering process by a PDCP sequence number. When the reordering process of the PDCP layer is performed, the reordering process by the RLC layer may not need to perform. However, both reordering processes by the PDCP layer and the RLC layer may be performed together for downlink data unit transmission.

The reordering indication message may includes information to determine whether the reordering process by the RLC layer has to keep being performed or the reordering process by the RLC layer has to be terminated. The reordering indication message may be a message generated in a Radio Resource Control (RRC) entity of the base station. The reordering indication message may transmit with including information related to the reordering function of the PDCP and the RLC when the RLC SDU is generated during the downlink data unit transmission.

Figure 9:
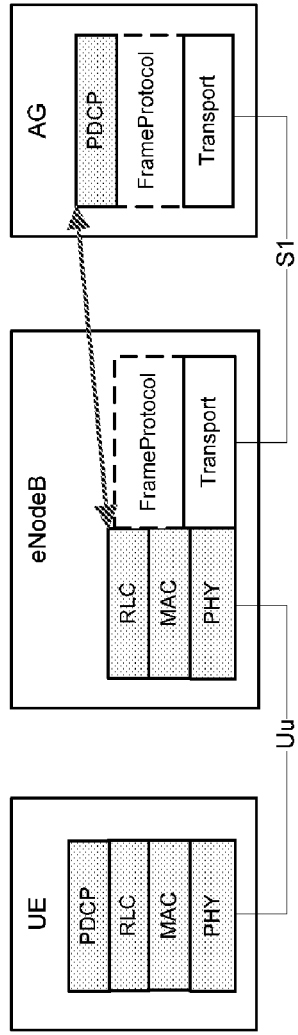
FIG. 9 shows an exemplary E-UTRAN protocol architecture for uplink data unit transmission.

FIG. 9 shows an exemplary E-UTRAN protocol architecture for the uplink data unit transmission.

As illustrated in FIG. 9, the wireless interface protocols are represented as a PDCP layer, a RLC layer, a MAC layer, a PHY layer, and so on. In contrast to a RLC layer and PDCP layer of the terminal, the RLC layer and the PDCP layer for the E-UTRAN are located in different network nodes such as an eNodeB and an Access Gateway (AG) respectively. The wireless interface protocols are inter-related to each other. For example, the RLC layer of the base station and the PDCP layer of the gateway are inter-related to each other, and to communicate, a signaling message generated in the S1 interface may be used for data transmission and controlling between two layers. Here, the generated signaling message may be used to transmit a reordering indication message to the gateway. Also, a NBAP message which defined in the Iub interface may be used to transmit the reordering indication message. The reordering indication message may be included in a generated service data unit (SDU) by the RLC or in a header field of the RLC. The reordering indication message may be represented by a single bit to minimize a signaling traffic.

Figure 10:
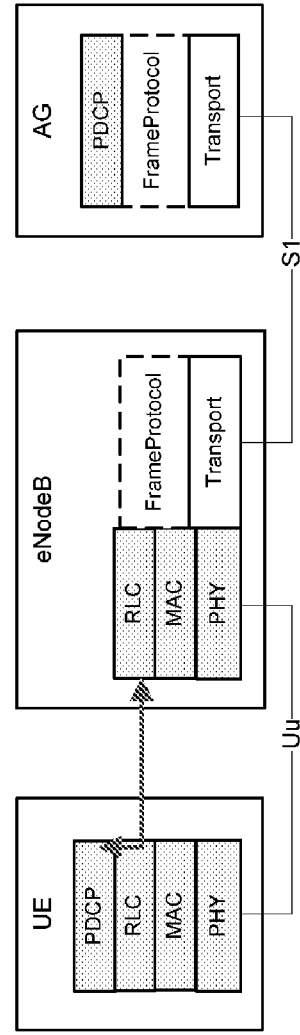
FIG. 10 shows an exemplary E-UTRAN protocol architecture for downlink data unit transmission.

FIG. 10 shows an exemplary E-UTRAN protocol architecture for downlink data unit transmission.

As illustrated in FIG. 10, both the RLC layer of the terminal and the PDCP layer of the terminal may perform the reordering function at the same time. Also, either the RLC layer of the terminal or the PDCP layer of the terminal may perform the reordering function. The reordering indication message may include a request for the reordering process within the PDCP layer if the terminal performs the reordering process in the PDCP layer.

The base station may transmit the reordering indication message if the terminal is determined to perform a handover procedure. The terminal may receive the downlink data unit in order of a transmitted data unit from the gateway according to the reordering function during the handover procedure. If the handover procedure is over, the reordering process by the PDCP layer is no longer necessary, so the base station may transmit a handover complete message or a request message for a reordering function termination to the terminal, and then the terminal may terminate the reordering function by the PDCP layer when such message is received. The reordering process by the PDCP layer may perform in a certain layer between the PDCP layer and the RLC layer. In this case, the certain layer is positioned below the PDCP layer and above the RLC layer. Also, the reordering process may be performed in below the PDCP layer of the gateway if it is an uplink data unit transmission.

The present invention provides a method of receiving uplink data in a mobile communications system, the method comprising: deciding to perform a handover for a terminal; and transmitting an indication to an Access Gateway (AG) when the handover needs to be performed according to the deciding step, to allow the AG to perform uplink data reordering upon receiving the indication; wherein the indication is transmitted to the AG via at least one of a RLC generated Service Data Unit (SDU), a single bit, and a header field of the RLC; wherein the indication is received via a signaling message which defined between a Radio Link Control (RLC) layer of the base station and a Packet Data Convergence Protocol (PDCP) layer of an Access Gateway (AG); wherein the indication is either a uni-directional message or a bi-directional message; wherein the indication is a reordering request message.

Also, the present invention provides a method of receiving downlink data in a mobile communications system, the method comprising: receiving the downlink data from one or more base stations; receiving a reordering indication from one of the base stations when a handover is performed; performing downlink data reordering after receiving the reordering indication; and transmitting a reordering confirmation upon receiving the reordering indication; wherein the downlink data reordering is processed by a header compression entity in a terminal; wherein the reordering indication is either a uni-directional message or a bi-directional message; wherein the reordering indication is received via at least one of a RLC generated data unit, a single bit, and a header field of the RLC; wherein the reordering indication is generated by a Radio Resource Control (RRC) layer of the one or more base stations; wherein the one of the base stations is either a source base station or a target base station.

Also, the present invention provides a method of communicating data in a mobile communications system, the method comprising: transmitting an indication, from a first node to a second node when a handover is performed; communicating data between the first node and the second node; and performing a reordering process for the data, by the second node, upon receiving the indication; wherein the second node includes a header compression entity; wherein the first node is a base station and the second node is either a terminal or an Access Gateway (AG); wherein the uplink data reordering is processed by a header compression entity in the AG or by a lower layer below the header compression entity in the AG; wherein the AG includes a reordering buffer to store the uplink data for the uplink data reordering.

Further, the present invention provides a mobile terminal for receiving downlink data in a mobile communications system, the mobile terminal comprising: a lower level protocol entity adapted to receive a indication from a base station when a handover is performed; and a header compression entity above the lower level protocol entity adapted to perform a reordering process for downlink data upon receiving the indication.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention is not intended to limit the scope of the present invention to a certain type of wireless communication system. The present invention is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Any reference in this specification to "one embodiment", "an embodiment", "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of receiving uplink data in a mobile communications system, the method comprising:
determining whether a handover for a terminal from a first base station to a second base station is required; and
transmitting an indication to an Access Gateway (AG) for allowing the AG to perform uplink data reordering when it is determined that the handover is required,
wherein the first base station transmits any uplink data received from the terminal to the AG without considering an order sequence of the uplink data, and wherein the second base station transmits any uplink data received from the terminal to the AG without considering the order sequence of the uplink data.

2. The method of claim 1, wherein the indication is transmitted to the AG via a Radio Link Control (RLC) generated Service Data Unit (SDU), a single bit, or a header field of an RLC message.

3. The method of claim 1, wherein the indication is received via a signaling message defined between a Radio Link Control (RLC) layer of the first or second base station and a Packet Data Convergence Protocol (PDCP) layer of the AG.

4. The method of claim 1, wherein the indication is either a uni-directional message or a bi-directional message.

5. The method of claim 1, wherein the indication is a reordering request message.

6. A method of receiving downlink data in a mobile communications system, the method performed by a terminal and comprising:
receiving the downlink data from at least a first base station or a second base station;
receiving a reordering indication from the first base station or the second base station when a handover from the first base station to the second base station is performed; and
performing downlink data reordering after receiving the reordering indication,
wherein the downlink data reordering is processed by a header compression entity in the terminal,
wherein the downlink data received in the terminal from the first base station is received by the first base station from an Access Gateway (AG) and transmitted by the first base station to the terminal without considering an order sequence of the downlink data, and
wherein the downlink data received in the terminal from the second base station is received by the second base station from the AG and transmitted by the second base station to the terminal without considering the order sequence of the downlink data.

7. The method of claim 6, wherein the reordering indication is either a uni-directional message or a bi-directional message.

8. The method of claim 6, wherein the reordering indication is received via a Radio Link Control (RLC) generated data unit, a single bit, or a header field of an RLC message.

9. The method of claim 6, wherein the reordering indication is generated by a Radio Resource Control (RRC) layer of the first or second base station.

10. The method of claim 6, wherein the first base station is a source base station and the second base station is a target base station.

11. The method of claim 6, further comprising: transmitting a reordering confirmation message upon receiving the reordering indication.

12. The method of claim 6, wherein the downlink data reordering is performed simultaneously in a Radio Link Control (RLC) layer of the terminal and a Packet Data Convergence Protocol (PDCP) layer of the terminal.

* * * * *